United States Patent [19]
Hendrick

[11] 3,917,219
[45] Nov. 4, 1975

[54] PRESSURE OPERATED FLOW CONTROL DEVICE

[75] Inventor: Fred W. Hendrick, Los Angeles, Calif.

[73] Assignee: Robertshaw Controls Company, Richmond, Va.

[22] Filed: Sept. 4, 1973

[21] Appl. No.: 394,025

[52] U.S. Cl. .................................. 251/45; 251/61.1
[51] Int. Cl.² ....................................... F16K 31/385
[58] Field of Search ....... 251/45, 46, 61.1; 137/489, 137/495, 489.5

[56] References Cited
UNITED STATES PATENTS

| | | | |
|---|---|---|---|
| 2,388,868 | 11/1945 | Ray | 251/45 X |
| 3,036,778 | 5/1962 | Dillman | 137/489 X |
| 3,351,085 | 11/1967 | Allingham | 137/495 |
| 3,489,350 | 1/1970 | Caparone | 251/45 X |

Primary Examiner—Arnold Rosenthal
Attorney, Agent, or Firm—Anthony A. O'Brien

[57] ABSTRACT

A flow control device having a pressure operated main diaphragm valve controlled by bleed line pressure includes a baffle extending from the diaphragm of the main valve to create turbulent flow adjacent a port of the bleed line upstream of the main diaphragm valve such that pressure at the bleed line port is maintained at a level to close the main diaphragm valve and thereby eliminate venturi or aspirator effects under high flow conditions.

7 Claims, 3 Drawing Figures

PRESSURE OPERATED FLOW CONTROL DEVICE

BACKGROUND OF THE INVENTION

1. Field of the Invention

The present invention pertains to flow control devices and, more particularly, to flow control devices having a main diaphragm valve controlled by bleed line pressure.

2. Description of the Prior Art

Prior art flow control devices, as exemplified by U.S. Pat. No. 3,513,873 to Graham et al., conventionally utilize bleed line pressure to control a main diaphragm valve. The main diaphragm valve normally has a diaphragm defining an operating pressure chamber, and an actuating mechanism controls a bleed valve to subject the operating pressure chamber to either inlet pressure or outlet pressure through a bleed line extending from a port on the inlet side of the main diaphragm valve to a port on the outlet side of the main diaphragm valve. When inlet pressure is communicated to the operating pressure chamber, there will be no pressure differential across the diaphragm, and a bias spring will move the diaphragm against a valve seat to prevent flow between an inlet and an outlet of a casing of the flow control device. Conversely, when outlet pressure is communicated to the operating pressure chamber, the pressure differential across the main diaphragm valve will be sufficient to move the diaphragm away from the valve seat to permit flow between the inlet and the outlet.

The inlet bleed line port is conventionally located just upstream of the main diaphragm valve; and, thus, during high flow conditions, the high velocity flow tends to cause a a venturi or aspirator effect on the bleed line substantially reducing the pressure therein. Accordingly, when the bleed valve is operated to an "off" condition to subject the operating pressure chamber to inlet pressure and close the main diaphragm valve, the pressure communicated to the operating pressure chamber will be less than inlet pressure thereby permitting the main diaphragm valve to remain open and causing a "run away" valve condition.

SUMMARY OF THE INVENTION

The present invention is generally summarized in a flow control device including a casing having an inlet, an outlet and a flow passage therebetween; a main valve including a valve seat disposed in the flow passage and a diaphragm cooperating with the valve seat to control flow between the inlet and the outlet, the diaphragm having a first side defining an operating pressure chamber and a second side defining an inlet pressure chamber; control means for operating the main valve including a bleed line communicating with the inlet pressure chamber at a port upstream of the valve seat and with the flow passage downstream of the valve seat, a bleed valve controlling flow through the bleed line and a passage communicating with the bleed line and the operating pressure chamber to subject the operating pressure chamber to inlet pressure to close the main valve and to outlet pressure to open the main valve; and flow disrupting means extending into the inlet pressure chamber to create turbulent flow adjacent the bleed line port whereby the pressure at the bleed line port is maintained at a level to close the main valve even under high flow conditions.

Accordingly, it is a basic object of the present invention to prevent "run away" valve operation in a pressure operated flow control device.

Another object of the present invention is to dispose a baffle in a flow passage through a pressure operated flow control device to create turbulance adjacent a bleed line port in order to eliminate any venturi or aspirator effect on the bleed line.

A further object of the present invention is to integrally form a diaphragm of a main valve in a pressure operated flow control device with a baffle extending transversely therefrom and disposed in alignment with a bleed line port to disrupt flow through the flow control device and maintain pressure at the bleed line port at a level to close the main valve even under high flow conditions.

Some of the advantages of the present invention over the prior art are that "run away" valve operation in a pressure operated flow control device is prevented without requiring major design changes in the casing to relocate the bleed line port, the baffle can be conveniently formed integrally with the diaphragm with only slight changes in the mold therefor, and the configuration and location of the baffle permits operation under high flow conditions while assuring main valve closure.

Other objects and advantages of the present invention will become apparent from the following description of the preferred embodiment taken in conjunction with the accompanying drawings.

DESCRIPTION OF THE PREFERRED EMBODIMENT

Figure 1:
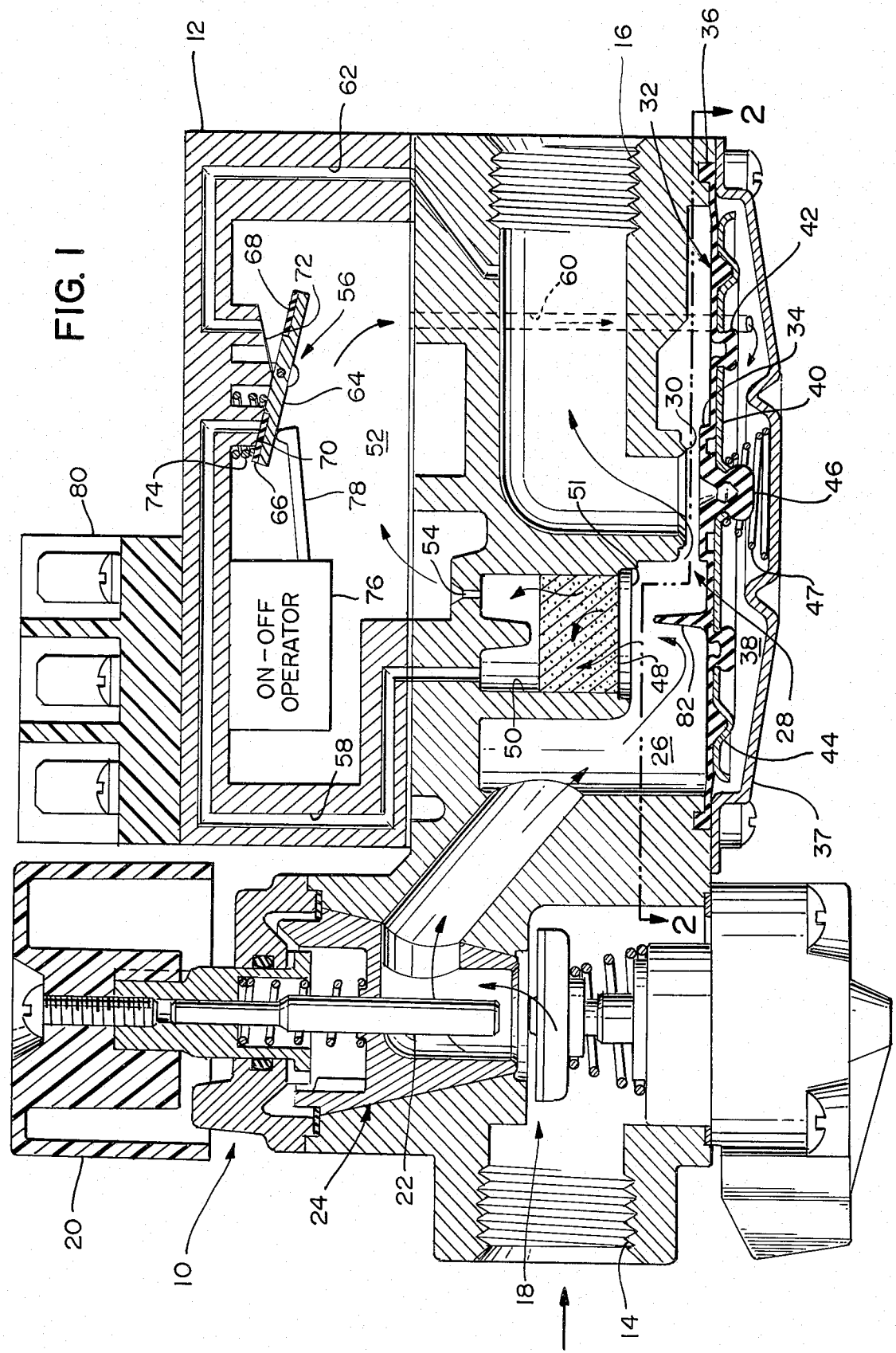
FIG. 1 is a vertical section of a pressure operated flow control device according to the present invention.
Figure 2:
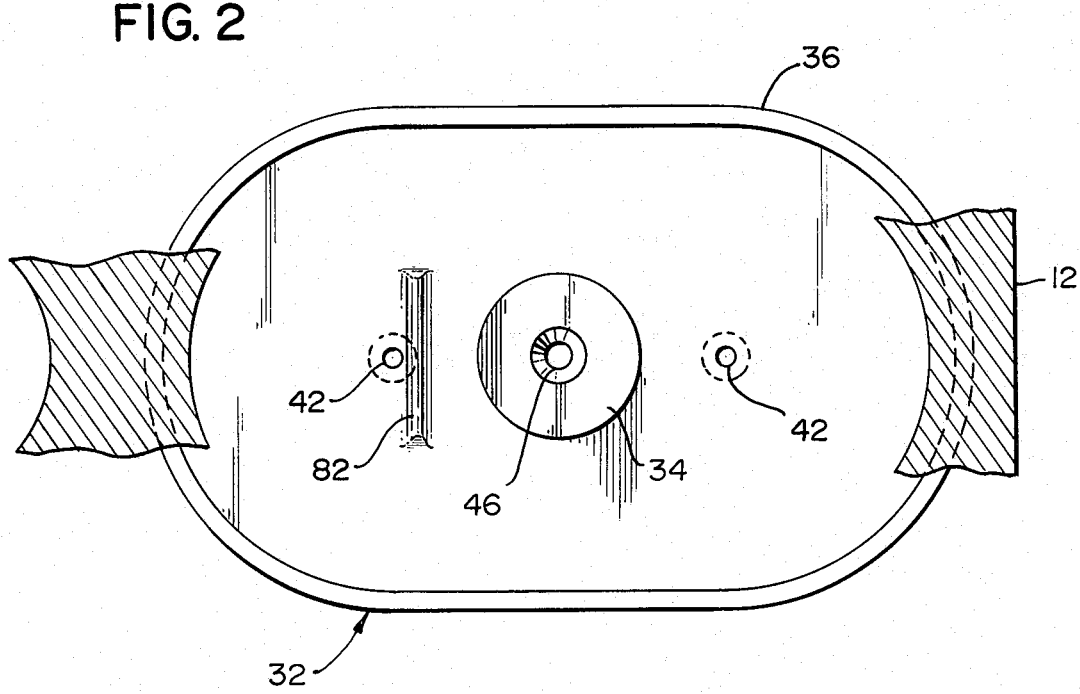
FIG. 2 is a section taken along line 2—2 of FIG. 1.
Figure 3:
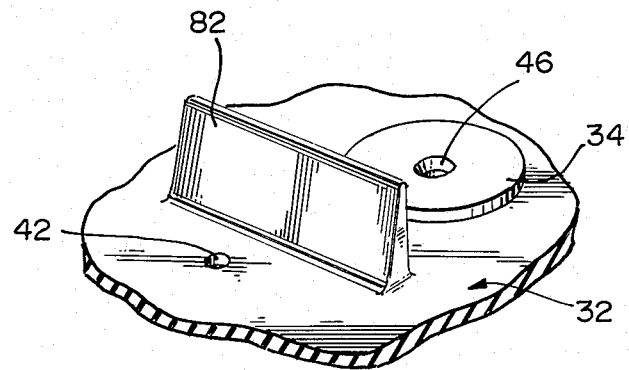
FIG. 3 is a broken perspective of the diaphragm and baffle of the pressure operated flow control device of FIG. 1.

A pressure operated flow control device 10 according to the present invention, as illustrated in FIGS. 1, 2 and 3, includes a casing 12 having an inlet port 14 adapted to be connected with a suitable fuel supply, such as a gas source (not shown), and an outlet port 16 adapted to supply fuel to burner apparatus (not shown) with a flow passage therebetween. A safety valve 18 is disposed in the casing 12 adjacent the inlet port 14, and a control knob 20 is axially movable to move a stem 22 to open the safety valve and rotatable roratable to control a plug valve 24 such that the safety valve and the plug valve control fuel supply to an inlet pressure chamber 26. A main diaphragm valve 28 includes an annular valve seat 30 formed by a wall in the flow passage through the casing and a substantially flat, flexible diaphragm 32 centrally carrying a valve member 34 cooperating with the valve seat 30 to control flow between inlet pressure chamber 26 and the outlet port 16. The diaphragm 32 has a marginal bead 36 formed along the periphery thereof which is sandwiched between a recess in the casing 12 and a bottom wall 37 to provide a fluid tight seal and define an operating pressure chamber 38 below the diaphragm. A backup plate 40 is mounted and positioned on the diaphragm 32 by means of a rib 42 and nibs 44 formed on the diaphragm, and the central portion of the diaphragm is formed with a thickened button-like protrusion 46 mounting the back-up plate 40 and a raised protruding portion defining the valve member 34. A coiled spring 47 is mounted in compression in the operating pressure chamber 38 between wall 37 and back-up plate 40.

A filter 48 is disposed in a cavity 50 formed in the casing 12 and communicating with the inlet pressure chamber 26 upstream of the valve seat 30 of the main valve 28 to define a port 51 for a bleed line extending from the inlet side of the main valve 28 to the outlet side thereof. The port 51 opens into a wall of the inlet pressure chamber 26, which wall is generally parallel to the flow passage from the inlet port 14 to the valve seat 30. The bleed line includes a bleed valve chamber 52 communicating with the cavity 50 through a restricted bleed passage 54 and, via a bleed valve 56, a by-pass bleed passage 58. Bleed valve chamber 52 communicates with the operating pressure chamber 38 through a passage 60 and with the outlet through a bleed passage 62 via the bleed valve 56. The bleed valve 56 includes a pivotally mounted lever 64 carrying valve members 66 and 68 on opposite ends thereof for cooperating with valve seats 70 and 72, respectively, to control flow from the bleed passages 58 and 62 to the bleed valve chamber 52. The lever 64 is controlled by a bias spring 74 and an on-off operator 76, such as an electromagnet, controlling an arm 78 engaging the lever 64. The operator 76 receives electricity, for instance, under the control of a space thermostat (not shown) at a terminal block 80.

As thus far described, the flow control device 10 is conventional; and, accordingly, the specific structure and function of the components thereof will not be described in detail hereinafter, it being noted that the bleed valve operator 76 can have any desired structure responsive to either electricity controlled by a condition responsive switch, hydraulic or mechanical movement from a bellows or other thermally movable mechanism or the like. Similarly, the safety valve 18 and plug valve 24 can have any desired structure and are not necessarily required in order to practice the present invention. For further detail with respect to the structure of the pressure operated flow control device 10, as thus far described, reference is made to U.S. Pat. No. 3,513,873 to Graham et al., which patent is incorporated herein by reference.

In accordance with the present invention, a spoiler baffle 82 is formed on the upper side of the diaphragm 32 at a position aligned with the bleed line port 51, the baffle having a rounded, wedge-shaped configuration in cross section and defining a rectangular surface disposed to face flow from the inlet. The baffle 82 extends transversely from the diaphragm 32 and is disposed in a generally transverse position to the direction of flow through the inlet pressure chamber 26. The baffle 82 is formed integrally with the diaphragm 32, such as by a molding process, whereby the entire diaphragm 32 can be integrally formed of a single piece of elastomeric material, such as rubber.

In operation, the plug valve 24 is initially rotated to supply fuel to the burner apparatus, and the safety valve 18 is opened by axial movement of the stem 22 and maintained open by a thermoelectric magnet in response to the flame at the burner apparatus. Main flow to the burner apparatus will be supplied under the control of main diaphragm valve 28 operated by the bleed valve 56 which is controlled in accordance with demand conditions.

In the off condition, there is no demand for fuel; and, accordingly, the operator 76 is deenergized such that spring 74 pivots the lever 64 to move valve member 68 against valve seat 72 and to move valve member 66 away from valve seat 70 to permit communication between inlet pressure chamber 26 and bleed valve chamber 52 through port 51, cavity 50 restricted bleed passage 54 and by-pass bleed passage 58. Accordingly, bleed valve chamber 52 will be at inlet pressure and such pressure will be communicated to operating pressure chamber 38 such that diaphragm 32 will have inlet pressure on both sides thereof thereby permitting spring 47 to move the valve member 34 of the diaphragm against the valve seat 30 to close the main diaphragm valve 28.

When there is a demand for fuel flow, the operator 76 will move the arm 78 to pivot the lever 64 and move the valve member 66 against valve seat 70 while moving valve member 68 away from valve seat 72 to place the bleed valve 56 in the on condition, as shown in FIG. 1. With the bleed valve in this condition, the pressure in bleed valve chamber 52 and operating pressure chamber 38 is reduced due to the restricted flow through bleed passage 54 and the communication through bleed passage 62 with the outlet port 16. Accordingly, operating pressure chamber 38 will sense outlet pressure; and, since inlet pressure is greater than outlet pressure, the diaphragm 32 will deflect against the force of spring 47 to open the main diaphragm valve and permit fuel flow through the casing 12.

The baffle 82 disrupts flow through the inlet pressure chamber to create turbulence adjacent the bleed line port 51; and, thus, there will be no aspirator or venturi effect on the bleed line such that even under high flow conditions, once the operator 76 returns the bleed valve 56 to the off condition as described above, the pressure in the operating pressure chamber 38 will increase to inlet pressure to effect main diaphragm valve closure upon demand. That is, the disruption of flow by the baffle 82 maintains the pressure at the bleed line port 51 at a level such that the pressure in operating pressure chamber 38 is sufficient to permit closure of the main valve 28 and prevent "run away" valve operation and partial main valve closure under high flow conditions.

Inasmuch as the present invention is subject to many variations, modifications and changes in detail, it is intended that all matter described above or shown in the accompanying drawings be interpreted as illustrative and not in a limiting sense.

What is claimed is:

1. A flow control device comprising
  a casing having inlet means, outlet means and interior wall means forming a flow passage therebetween;
  main valve means including a valve seat disposed in said flow passage and diaphragm means cooperating with said valve seat to control flow between said inlet means and said outlet means, said diaphragm means having a first side defining an operating pressure chamber and a second side defining an inlet pressure chamber;
  control means for operating said main valve means including a bleed line port in a portion of said interior wall means upstream of said valve seat, bleed line means communicating with said inlet pressure chamber at said bleed line port and with said flow passage downstream of said valve seat, bleed valve means controlling flow through said bleed line means, and passage means communicating with said bleed line means and said operating pressure chamber to subject said operating pressure chamber to inlet pressure to close said main valve means and to outlet pressure to open said main valve means, said portion of the interior wall means being substantially parallel to the flow passage; and flow disrupting means extending into said flow passage to create turbulent flow adjacent said bleed line port whereby the pressure at said bleed line port is maintained at a level to close said main valve means even under high flow conditions;

said flow disrupting means being carried on said second side of said diaphragm means.

2. A flow control device as recited in claim 1 wherein said flow disrupting means includes a baffle integrally formed with said diaphragm means and aligned with said bleed line port.

3. A flow control device as recited in claim 2 wherein said baffle extends substantially transversely from said diaphragm means.

4. A flow control device as recited in claim 3 wherein said baffle has a surface with a substantially rectangular configuration disposed to face flow from said inlet means.

5. A flow control device as recited in claim 1 wherein said flow disrupting means includes a baffle extending substantially transversely to the direction of flow through said inlet pressure chamber.

6. A flow control device as recited in claim 5 wherein said baffle extends substantially transversely from said second side of said diaphragm means in alignment with said bleed line port.

7. A flow control device comprising a casing having inlet means, outlet means and interior wall means forming a flow passage therebetween;

main valve means including a valve seat disposed in said flow passage and diaphragm means cooperating with said valve seat to control flow between said inlet means and said outlet means, said diaphragm means having a first side defining an operating pressure chamber and a second side defining an inlet pressure chamber;

control means for operating said main valve means including a bleed line port in a portion of said interior wall means upstream of said valve seat, bleed lines means communicating with said inlet pressure chamber at said bleed line port and with said flow passage downstream of said valve seat, bleed valve means controlling flow through said bleed line means, and passage means communicating with said bleed line means and said operating pressure chamber to subject said operating pressure chamber to inlet pressure to close said main valve means and to outlet pressure to open said main valve means, said portion of the interior wall means being substantially parallel to the flow passage; and flow disrupting means extending into said flow passage to create turbulent flow adjacent said bleed line part whereby the pressure at said bleed line port is maintained at a level to close said main valve means even under high flow conditions;

said bleed line means including a bleed valve chamber communicating with said passage means, a restricted bleed passage communicating with said bleed line port and said bleed valve chamber, a bypass bleed passage communicating with said bleed line part and terminating at an inlet bleed passage valve seat in said bleed valve chamber, and an outlet bleed passage communicating with said flow passage downstream of said valve seat and terminating at an outlet bleed passage valve seat in said bleed valve chamber;

said bleed valve means including valve member means cooperating with said inlet and outlet bleed passage valve seats to selectively connect said bypass bleed passage or said outlet bleed passage with said bleed valve chamber;

said diaphragm means including a substantially flat diaphragm having a protruding control portion forming a valve member cooperating with said main valve seat; and said flow disrupting means including a baffle integrally formed with said diaphragm and extending substantially transversely from said second side in alignment with said bleed line port.

* * * * *